(12) United States Patent
Lee

(10) Patent No.: US 6,261,171 B1
(45) Date of Patent: Jul. 17, 2001

(54) MOVABLE MULTI-FUNCTION MAINTENANCE APPARATUS

(75) Inventor: Wen-Hong Lee, Hsin Chu (TW)

(73) Assignee: Taiwan Semiconductor Manufacturing Co., Ltd., Hsinchu (TW)

(*) Notice: Subject to any disclaimer, the term of this patent is extended or adjusted under 35 U.S.C. 154(b) by 0 days.

(21) Appl. No.: 09/313,169

(22) Filed: May 17, 1999

(30) Foreign Application Priority Data

Apr. 15, 1999 (TW) ................................................ 88106000

(51) Int. Cl.⁷ ....................................................... B08B 15/02

(52) U.S. Cl. ......................... 454/56; 312/293.1; 454/49; 454/187

(58) Field of Search ............................... 454/56, 49, 187; 312/31.2, 293.1; 220/377; 414/900

(56) References Cited

U.S. PATENT DOCUMENTS

| | | | |
|---|---|---|---|
| 4,111,753 | * | 9/1978 | Folsom et al. ........................ 195/126 |
| 5,257,957 | * | 11/1993 | Diccianni et al. ..................... 454/57 |
| 5,262,578 | * | 11/1993 | Hall ...................................... 588/249 |
| 5,316,541 | * | 5/1994 | Fischer ................................. 600/21 |
| 5,685,771 | * | 11/1997 | Kleppen ................................ 454/56 |

* cited by examiner

*Primary Examiner*—Harold Joyce
*Assistant Examiner*—Derek S. Boles
(74) *Attorney, Agent, or Firm*—Jiawei Huang; J.C. Patents

(57) ABSTRACT

A movable multi-function maintenance apparatus. A first airtight chamber is formed on the second airtight chamber. An exhaust apparatus is placed in a base under the first airtight chamber in order to exhaust first and the second airtight chambers. Thus, the environment is not polluted. A toxic-gas detector is mounted on the first airtight chamber in order to warn workers. A rolling structure is mounted under the base to move the movable multi-function maintenance apparatus.

13 Claims, 2 Drawing Sheets

MOVABLE MULTI-FUNCTION MAINTENANCE APPARATUS

CROSS-REFERENCE TO RELATED APPLICATION

This application claims the priority benefit of Taiwan application serial no. 88106000 filed Apr. 15, 1999, the full disclosure of which is incorporated herein by reference.

BACKGROUND OF THE INVENTION

1. Field of the Invention

The present invention relates to a maintenance apparatus. More particularly, the present invention relates to a movable multi-function maintenance apparatus, which prevents air pollution and protects the safety of workers.

2. Description of the Related Art

In order to meet different fabrication requirements, gases which may comprise toxic gases or flammable gases, are increasingly required in semiconductor industry. These toxic or flammable gases cause a safety problem of worker. In a semiconductor factory, a clean and dustless environment, which is usually semi-isolated, is required. However, since most of the maintenance apparatuses to achieve the above environment are not properly isolated, there is an elevated risk for workers while disassembling machines for maintenance. The pollution problem becomes particularly serious when as leakage occurs, and such pollution may damage the health of workers instantly or gradually.

SUMMARY OF THE INVENTION

The invention provides a movable multi-function maintenance apparatus. A support apparatus connected to a base. A first airtight chamber is supported by the support apparatus on the base. The first airtight chamber comprises a ceiling, a floor, and a sidewall. Central portions of the ceiling and the floor are slightly raised above the edge portions of the ceiling and the floor. A first vacuum ventilator is formed in the floor. The first vacuum ventilator can be open or closed. An electric door mounted on the sidewall in order to deliver in and out the mechanical members. A detachable transparent outer covers the ceiling of the first airtight chamber to form a second airtight chamber. A second vacuum ventilator formed in the transparent outer cover. A manipulation apparatus is mounted in the transparent outer cover. A toxic-gas detector is mounted on the transparent outer cover. An exhaust apparatus is placed in the base and connected to the first and the second vacuum ventilators. A rolling structure is mounted under the base to facilitate movement of the multi-function maintenance apparatus.

The present invention provide a movable multi-function maintenance apparatus to enable workers work in a safe environment, as well as to prevent from polluting the environment. In addition, the movable multi-function maintenance apparatus of the invention is easy for workers to operate due to the mobility thereof.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
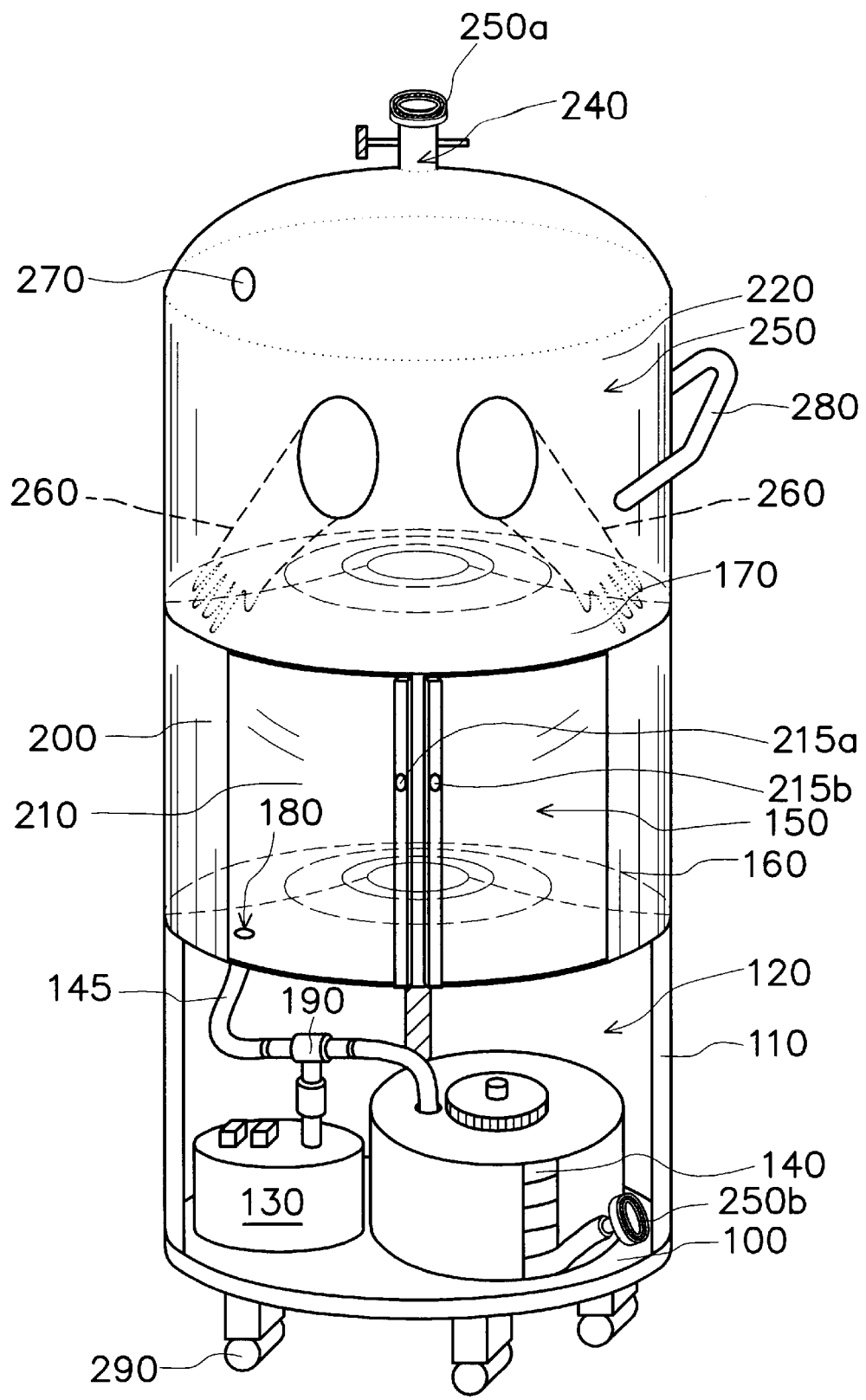
FIG. 1 is a schematic, transparent view showing a moveable multi-function maintenance apparatus according to one preferred embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
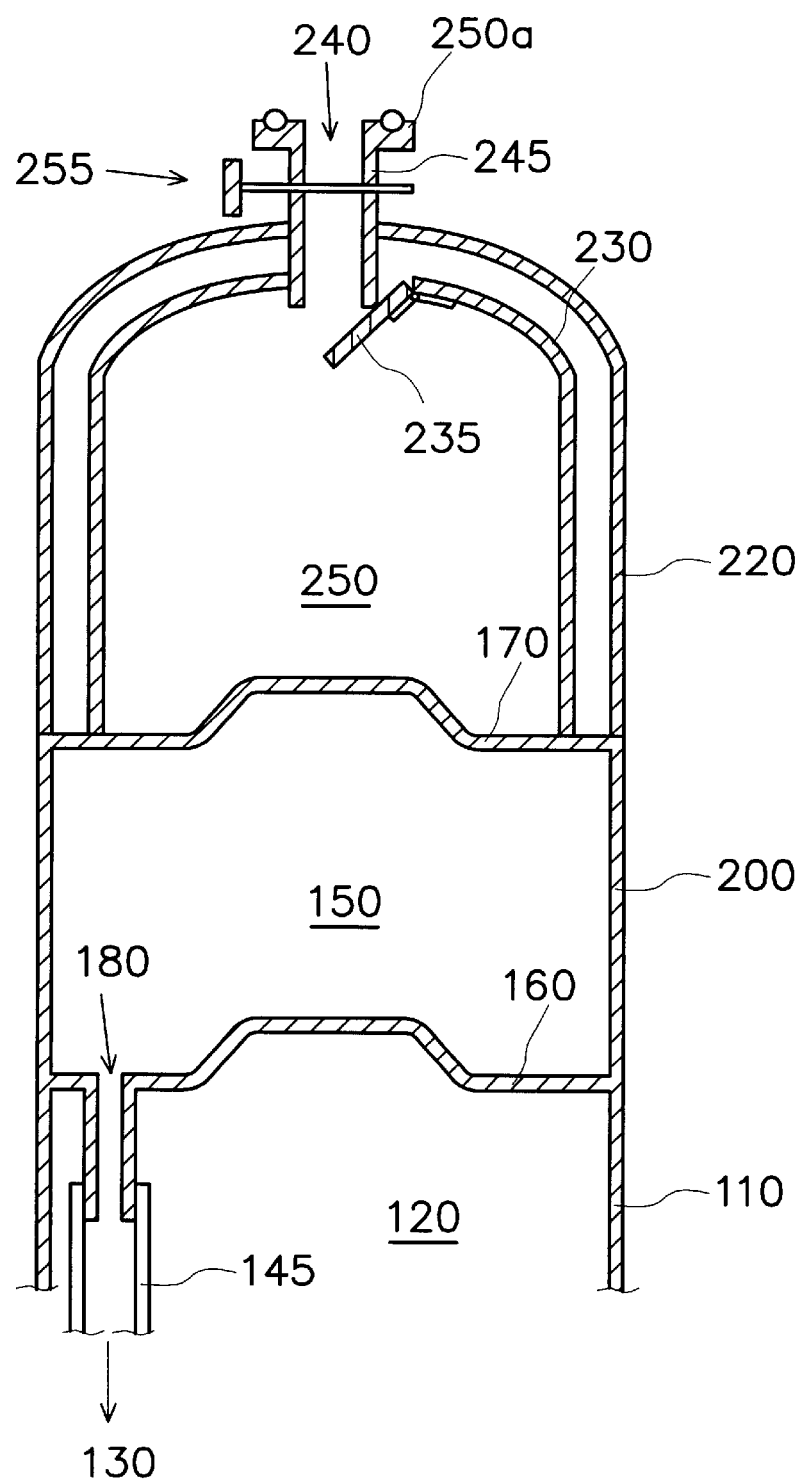
FIG. 2 is a schematic, cross-sectional view showing a portion of the moveable multi-function maintenance apparatus according to one preferred embodiment of the invention.

Reference is made to FIGS. 1 and 2, which are a schematic, transparent view and a schematic, cross-sectional view of part of the machine, showing a movable multi-function maintenance apparatus according to one preferred embodiment of the invention.

A support apparatus 110, such as a sidewall or a set of several columns, is connected to a base 100 to form a receptacle 120 over the base 100. An exhaust apparatus 130, such as a vacuum pump, can be placed in the receptacle 120. In addition, an exhaust hose 140 or a tool case (not shown) can be also placed in the receptacle 120.

A first airtight chamber 150 is supported by the support apparatus 110 on the base 100. The first airtight chamber 150 comprises a floor 160, a sidewall 200 and a ceiling 170. As shown in FIG. 2, the floor 160 and the ceiling 170 are preferably shaped with central portions slightly raised in order to prevent mechanical parts or members in the first airtight chamber 150 from rolling around, and particularly to prevent hollow cylinder or donut-shaped members of a reaction chamber (not shown) from rolling around. The cross section of the floor 160 and the ceiling 170 are shown in FIG. 2. A vacuum ventilator 180 is formed in the floor 160. The vacuum ventilator 180 is connected to an exhaust apparatus 130. In this embodiment, the vacuum ventilator 180 is connected to the exhaust apparatus 130 through a exhaust path comprising an exhaust hose 145 and a connector 190, in order to exhaust the first airtight chamber 150. However, any other valve can also be used on the path according to requirements. The sidewall 200 comprises an electric door 210 controlled by electric buttons 215a and 215b. The transparent electric door 210 provides a passage of the mechanical parts or members required for maintenance to be delivered in or out of the first airtight chamber 150.

A detachable transparent outer cover 220 entirely covers the upper surface of ceiling 170 to form a second airtight chamber 230. Since the transparent outer cover 220 is detachable, it is easy to place large fabrication machines, such as a reaction chamber, into the second airtight chamber 230 to perform a maintenance step. The transparent outer cover 220 comprises a exhaust pipe 245 having a valve 255 mounted thereon. The exhaust pipe 245 and the valve 255 together form a exhaust hole 240. The valve 255 opens or closes the second airtight chamber 230. The valve 255 can be connected to the exhaust apparatus 130 through, for example, connectors 250a and 250b and an exhaust host 140, so that the second airtight chamber 230 can be exhausted. An manipulation apparatus 260 is mounted in the transparent outer cover 220. The manipulation apparatus 260 can be, for example, a pair of gloves into which a worker may place his or her hands, so that the wafer is not exposed to the gases contained in the second airtight chamber 230. Alternatively, the manipulation apparatus 260 can be a robot arm remotely operated by a worker. Thus, the worker does not make contact with the machines directly because of the protection provided by the manipulation apparatus 260 and the second airtight chamber 230. A toxic-gas detector 270 is mounted on the transparent outer cover 270, in order to protect the worker and prevent the environment from being polluted. The toxic-gas detector 270 can be, for example, $Cl_2$ gas or $F_2$ gas detector according to specific requirement. A handle 280 is mounted on the transparent outer cover 220. While the worker is moving the multi-function maintenance apparatus, he or she can hold the handle 280.

The above-described transparent outer cover 220 can be detached to cover the machines to serve as an exhaust cover while an airtight cover 230 temporarily cover the mechanical members in the second airtight chamber 250. A single-way valve 235 is mounted on the airtight cover 230, although other suitable valves can also be used. The single-way valve 235 is used in order to exhaust the airtight cover 230 while the transparent outer cover 220 covers the ceiling 170. FIG. 2 shows an exemplary way for exhausting the airtight cover 230. After the exhaust pipe 245 of the transparent outer cover 220 pushes the single-way valve 235 open, the airtight cover 230 is exhausted. Once the exhaust pipe 245 is raised, the exhaustion of the airtight cover 230 stops.

In the invention, the connector 190 is preferably a three-way connector, for example, a T-type connector, which is advantageous for simultaneously exhaust the first airtight chamber 150 and the second airtight chamber 230.

Preferably, a rolling structure 290 is mounted under the base 100 in order to move the multi-function maintenance apparatus. The rolling structure 290 can be a set of wheels or rollers, for example.

As it is seen in the embodiment, the multi-function maintenance apparatus is moveable. Additionally, the two airtight chambers of the invention can be separately or simultaneously ventilated. The multi-function maintenance apparatus of the invention also comprises a toxic-gas detector. A machine can be disassembled in the airtight chamber while exhausting gases, so that toxic gas residue in the machine is removed. The toxic gas is exhausted through pipes into a treatment area. The maintenance work is conducted in such way that a safe environment is provided for workers.

In summary, the invention includes at least the following advantages:

1. The present invention protects workers from exposure to toxic gases.

2. The present invention benefits maintenance of a clean factory.

3. Since the multi-function maintenance apparatus of the invention comprises a rolling structure under it, the multi-function maintenance apparatus is easy for workers to move.

It will be apparent to those skilled in the art that various modifications and variations can be made to the structure and the method of the present invention without departing from the scope or spirit of the invention. In view of the foregoing, it is intended that the present invention cover modifications and variations of this invention provided they fall within the scope of the following claims and their equivalents.

What is claimed is:

1. A movable multi-function maintenance apparatus, comprising:
   a base; mechanical members
   a support apparatus connected to the base;
   a first airtight chamber supported by the support apparatus on the base, wherein the first airtight chamber comprises a ceiling, a floor, and a sidewall, and central portions of the ceiling and the floor are slightly raised above the edge portions of the ceiling and the floor;
   a first vacuum ventilator formed in the floor, wherein the first vacuum ventilator can be open or closed;
   an electric door mounted on the sidewall in order to deliver in or out the mechanical members;
   a detachable transparent outer cover covering the ceiling of the first airtight chamber to form a second airtight chamber;
   a second vacuum ventilator formed in the transparent outer cover;
   a manipulation apparatus mounted in the transparent outer cover;
   a toxic-gas detector mounted on the transparent outer cover;
   an exhaust apparatus placed in the base and connected to the first and the second vacuum ventilators; and
   a rolling structure mounted under the base to facilitate movement of the multi-function maintenance apparatus.

2. The apparatus of claim 1, wherein the support apparatus comprises a plurality of columns.

3. The apparatus of claim 1, wherein the support apparatus comprises a sidewall.

4. The apparatus of claim 1, wherein the first vacuum ventilator is controlled to open and to close.

5. The apparatus of claim 1, wherein the second vacuum ventilator is controlled to open and to close.

6. The apparatus of claim 1, wherein the manipulation apparatus comprises a pair of gloves.

7. The apparatus of claim 1, wherein the manipulation apparatus comprises a pair of robot arm.

8. The apparatus of claim 1, wherein the toxic-gas detector comprises a detector for detecting $Cl_2$ gas.

9. The apparatus of claim 1, further comprising an inner cover located in the transparent outer cover, wherein a single-way valve is mounted on the inner cover in order to exhaust the inner cover by the transparent outer cover.

10. The apparatus of claim 1, wherein the exhaust apparatus comprises a vacuum pump.

11. The apparatus of claim 1, wherein the rolling structure comprises a plurality of wheels.

12. The apparatus of claim 1, wherein the rolling structure comprises a plurality of rollers.

13. The apparatus of claim 1, wherein a handle is mounted on the transparent outer cover for a user to hold while moving the movable multi-function maintenance apparatus.

* * * * *